(12) United States Patent
Desroches et al.

(10) Patent No.: US 6,215,283 B1
(45) Date of Patent: Apr. 10, 2001

(54) METHOD AND DEVICE FOR CONTROLLING AN ALTERNATOR FOR A MOTOR VEHICLE

(75) Inventors: Philippe Desroches, Toulouse; Pascal Degardins, Le Fauga, both of (FR); Hans-Georg Weil, Gifhorn (DE)

(73) Assignee: Siemens Automotive, S.A., Toulouse-Cedex (FR)

( * ) Notice: Subject to any disclaimer, the term of this patent is extended or adjusted under 35 U.S.C. 154(b) by 0 days.

(21) Appl. No.: 09/202,732
(22) PCT Filed: May 1, 1997
(86) PCT No.: PCT/EP97/02338
  § 371 Date: Dec. 14, 1998
  § 102(e) Date: Dec. 14, 1998
(87) PCT Pub. No.: WO97/48164
  PCT Pub. Date: Dec. 18, 1997

(30) Foreign Application Priority Data

Jun. 14, 1996 (FR) .................................. 96 07588

(51) Int. Cl.$^7$ .................................................. H02P 9/04
(52) U.S. Cl. .............................................. 322/15; 322/14
(58) Field of Search ................................. 322/14, 15, 18, 322/28, 59

(56) References Cited

U.S. PATENT DOCUMENTS

| | | | |
|---|---|---|---|
| 4,308,492 | * | 12/1981 | Mori et al. .......................... 320/32 |
| 4,651,081 | * | 3/1987 | Nishimura et al. ................. 320/64 |
| 5,256,959 | * | 10/1993 | Nagano et al. ..................... 322/25 |
| 5,280,232 | * | 1/1994 | Kohl et al. ......................... 322/23 |
| 5,343,970 | * | 9/1994 | Severinsky ........................ 180/65.2 |
| 5,608,310 | * | 3/1997 | Watanabe .......................... 322/29 |
| 5,637,985 | * | 6/1997 | Kakizaki et al. ................... 322/28 |
| 5,808,367 | * | 9/1998 | Akagi et al. ....................... 290/40 C |
| 5,929,609 | * | 7/1999 | Joy et al. ............................ 322/25 |
| 5,982,155 | * | 11/1999 | Rechdan et al. ................... 322/36 |

FOREIGN PATENT DOCUMENTS

| | | |
|---|---|---|
| 4108751A1 | 9/1991 | (DE) . |
| 0179985A2 | 5/1986 | (EP) . |
| 2594273 | 8/1987 | (FR) . |

* cited by examiner

Primary Examiner—Nicholas Ponomarenko
(74) Attorney, Agent, or Firm—Herbert L. Lerner; Laurence A. Greenberg; Werner H. Stemer

(57) ABSTRACT

Method and device (1) for controlling an alternator (2) delivering an electrical current which supplies power to electrical consumers (4) in a motor vehicle equipped with an internal combustion engine and which recharges a battery (3), in which method and device, for each journey, the intensity of an excitation current (Ie) for the alternator is controlled as a function of a time profile Ie(t) constructed from a probable time profile ($\Omega a (t)$) of the rotary speeds of the alternator and from the current (Ic) absorbed by the consumers. Preferably, the time profile of the rotary speeds of the alternator is determined from data provided by a navigation device (7) optionally combined with a traffic density information receiver (7').

7 Claims, 1 Drawing Sheet

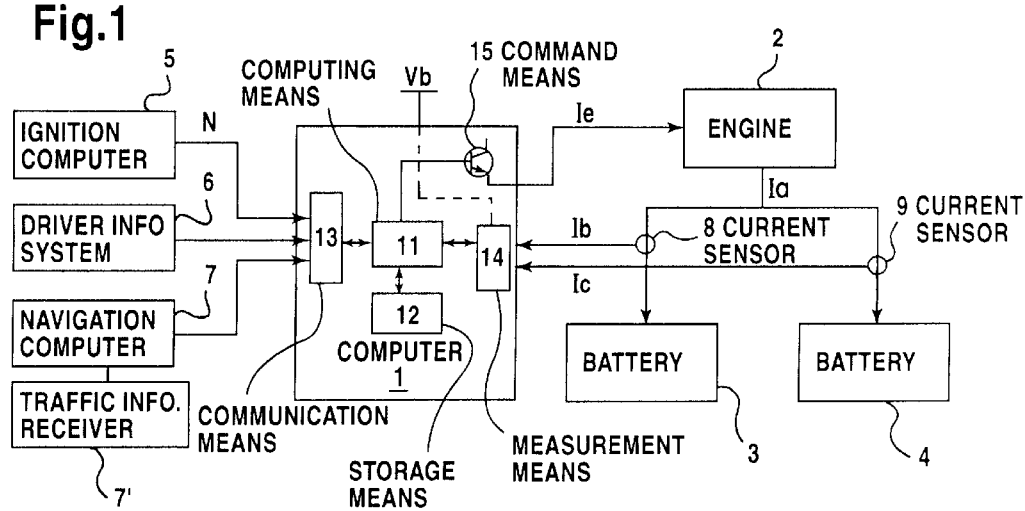
Fig.1
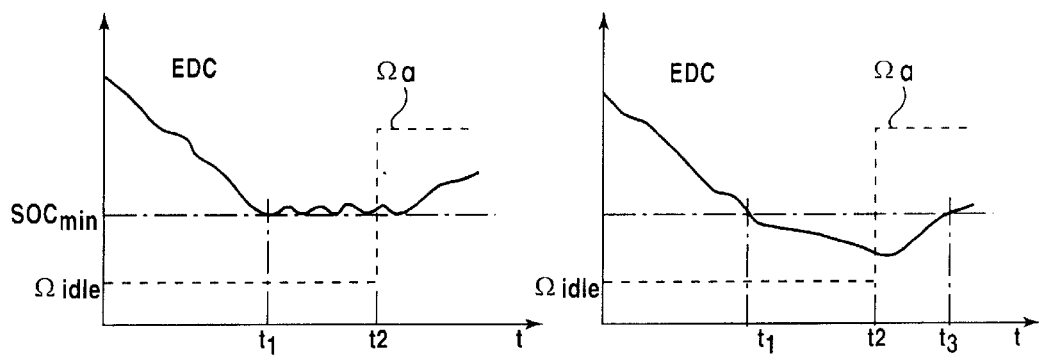
Fig.2A PRIOR ART
Fig.2B
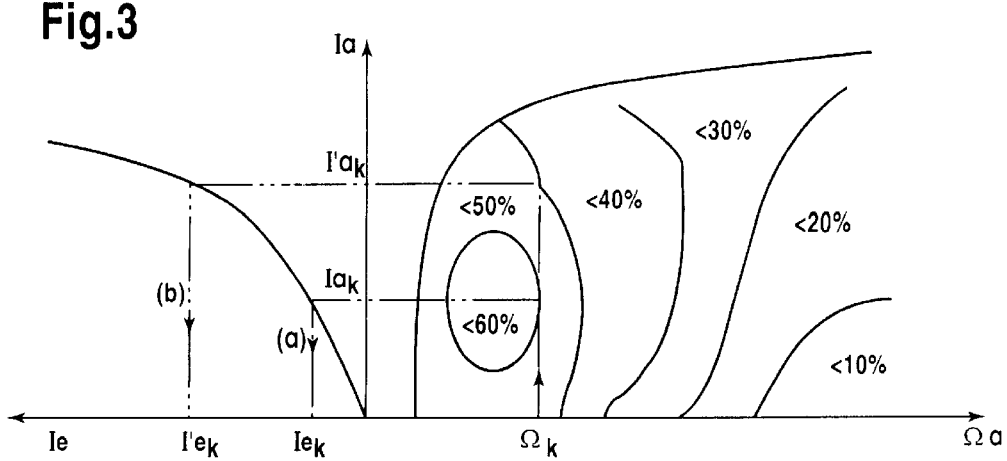
Fig.3

METHOD AND DEVICE FOR CONTROLLING AN ALTERNATOR FOR A MOTOR VEHICLE

BACKGROUND OF THE INVENTION

1. Field of the Invention

The present invention relates to a method and a device for controlling an alternator for a motor vehicle, of the type in which the intensity of an excitation current for the alternator is controlled depending on the operating conditions of the engine and of the vehicle.

2. Description of the Related Art

Known from the prior art, especially from document FR 2,594,273, is a device for controlling an alternator which allows its excitation current to be modulated depending on the operating conditions of the engine and/or of the vehicle so as to overexcite it when decelerating and to de-excite it when accelerating. Such a device makes it possible to improve the overall efficiency of the engine/alternator assembly. However, this improvement is limited by the need to restrain the de-excitation phases so as not to discharge the battery excessively. This is because such a device, looking only at the instantaneous operating conditions of the engine, may not allow a de-excitation phase to be maintained below a certain level of charge of the battery and forces the alternator to be put back into service even if conditions more propitious to recharging the battery should arise subsequently.

SUMMARY OF THE INVENTION

The object of the present invention is therefore to provide a method and a device for controlling an alternator for a motor vehicle which makes it possible to take into account the operating conditions over the entire journey and to improve the optimization of the alternator/engine assembly.

These objects of the invention are achieved, as well as others which will appear in the rest of the present description, by means of a method for controlling an alternator delivering an electrical current which supplies power to electrical consumers in a motor vehicle equipped with an internal combustion engine and which recharges a battery, in which method the intensity of an excitation current for the alternator is controlled depending on operating conditions of the engine and of the vehicle over a journey. According to the invention, for each journey, an initial state of charge of the battery is determined, a probable time profile of the rotary speeds of the alternator is computed for this journey, the current absorbed by the consumers is measured, an optimum time profile of the excitation current for the alternator is determined such that, at the end of the journey, the final state of charge of the battery is at least equal to a predetermined threshold, and the intensity of the excitation current is controlled according to the current profile determined. Advantageously, the measurement of the current absorbed is periodically updated and the optimum excitation profile to be applied to the alternator is recomputed at each update.

According to a first embodiment of the invention, the time profile of the rotary speeds of the alternator is computed from recordings made during previous journeys.

According to a second embodiment of the invention, the time profile of the rotary speeds of the alternator is computed from information relating to the intended journey and provided by a navigation device on board the vehicle.

Advantageously, in this embodiment, information relating to the density of the traffic over the journey in question, supplied by an RDS-type traffic information receiver coupled to the navigation device, is also used.

According to an important characteristic of the invention, the optimum time profile of the excitation current is computed in such a way that the efficiency of the alternator is a maximum if its rotary speed is greater than a predetermined threshold and the excitation current is zero otherwise.

The invention also provides a device for implementing the method, comprising, in combination, means of communication with at least one of the engine management and navigation devices, measurement means suitable for determining the state of charge of the battery and the intensity of the current delivered to the electrical consumers in the vehicle, computing means and storage means suitable for computing, from information transmitted by the communication means, at the start of each journey, a probable time profile of the rotary speeds of the alternator for this journey and for determining, depending on the information provided by the measurement means, an optimum time profile of the excitation current for the alternator such that, at the end of the journey, the final state of charge of the battery is at least equal to a predetermined threshold, and means for controlling the intensity of the excitation current delivered to the alternator.

BRIEF DESCRIPTION OF THE DRAWINGS

Other features and advantages of the invention will appear on reading the description which follows and on examining the appended drawings in which:

FIG. 1 shows a functional diagram of the device according to the invention;

FIGS. 2A and 2B show comparative time graphs of the state of charge of the battery as a function of a time profile for the rotation of the alternator, these being obtained using a method of the prior art and using the method according to the invention, respectively, and FIG. 3 shows a diagram of the efficiency curves of an alternator, these being stored in the device and used by the method.

DESCRIPTION OF THE PREFERRED EMBODIMENT

FIG. 1 shows a computer 1 comprising means 15 for controlling an excitation current Ie for an alternator 2 of a motor vehicle. The alternator 2 is rotated by the engine of the vehicle (not shown) and delivers an electrical current Ia=Ib+Ic to a battery 3 and to electrical consumers 4. Conventionally, depending on the excitation current Ie, on the rotary speed Wa of the alternator and on the current Ic supplied to the consumers 4, the current output by the alternator may be sufficient to provide a current Ib for recharging the battery, or may be topped up by the current Ib, then of negative sign, coming from the battery. These currents are measured by suitable sensors, for example Hall-effect sensors 8 and 9, the signal from which is transmitted to measurement means 14 included in the computer 1.

Advantageously, when the computer 1 is also used as a central processing unit for controlling the consumers in the vehicle, the current Ic may be deduced from the state of control of these consumers. Likewise, the voltage Vb across the terminals of the battery may be transmitted via the sensor 8 to the measurement means 14, or measured directly by noting that the computer 1 itself is a consumer supplied by the voltage Vb. The computer 1 furthermore includes computing means 11, such as a microprocessor, and storage means 12, such as ROM and RAM memories suitable for containing a program executable by the microprocessor and data which will be explained later. The computer 1 is also provided with communication means, such as an interface for a VAN- or CAN-type communication network, allowing it to receive information coming from other pieces of equipment in the vehicle such as, in this case, the rotary speed N of the engine provided by an ignition or injection computer 5, information relating to the data and time, supplied by a device for informing the driver 6 and itinerary information provided by an onboard navigation computer 7. The navigation computer 7 may advantageously be coupled to a traffic information receiver 7' of the RDS type, making it possible to supplement the itinerary information with the traffic density over this itinerary.

The operation of the device in FIG. 1 will now be described in relation to the graphs in FIGS. 2A and 2B, these showing the operation of the devices of the prior art and of that of the invention, respectively. Shown by dotted lines in these graphs is a time profile $\Omega a(t)$ of the rotary speed of the alternator such that, from $t_0$ to $t_2$, this speed is equal to a value $\Omega_{idle}$ corresponding approximately to the speed of the alternator when the engine is idling and, beyond $t_2$, this speed is very much greater, for example corresponding to an engine speed of about 4500 revolutions per minute. Shown as a solid line is the variation of a SOC parameter representative of the state of charge of the battery 3. This parameter may be simply estimated as a function of the voltage Vb across the terminals of the battery or, better still, computed iteratively as a function of the voltage Vb, the current Ib and time. It may be seen in FIGS. 2A and 2B that the alternator has been de-excited in order to relieve the engine while it is idling (rotary speed of the alternator= $\Omega_{idle}$). Consequently, the state of charge SOC of the battery 3 decreases uniformly, the latter supplying only the consumers 4. When, at the time t1, this state of charge reaches a minimum threshold $SOC_{min}$, the devices of the prior art (FIG. 2A) bring the alternator back into service so as to preserve a sufficient charge at the battery. This has the effect of applying an additional load to the engine, which may disturb its operation and cause pollution. In contrast, in FIG. 2B, according to the invention and as will be explained later, the computer 1 has knowledge of the time profile $\Omega a(t)$ of the rotary speeds of the alternator and knows that, after the time $t_2$, lying in the future, rotary speed conditions of the alternator allowing efficient recharging of the battery will be encountered. The computer can then determine, depending on the current Ic absorbed by the consumers in the vehicle, a time profile of the excitation current Ie(t) to be applied to the alternator after $t_2$, suitable for recharging the battery at least up to the minimum threshold reached at the time $t_3$. Consequently the device according to the invention allows the state of charge to fall below the $SOC_{min}$ threshold from $t_1$ to $t_2$ and makes it possible to optimize the operation of the engine/alternator pair.

A first procedure for implementing the method, allowing the computer 1 to provide the time profile of the rotary speeds of the alternator, will now be given in detail. In this procedure, the computer 1 makes use only of information provided by the ignition or injection computer 5 and the driver information device 6. From all this information, the computer 1 constructs and stores an experimental database in the following manner: the start of a journey is detected by the computer being switched on, corresponding to the vehicle being contacted. The computer then reads the date and time which are provided by the information device 6 and classifies this journey in a predetermined category. Noting that most short journeys, over which the desired optimization is most profitable, correspond to repeated journeys, it is possible to determine a certain number of categories by date and time of their start, for example a journey in the morning, on a week day if the journey starts between 6 a.m. and 10 a.m., from Monday to Friday, and so on. The computer then periodically reads the engine speed information supplied to it by the ignition computer 5 via the communication means 13 and computes from it the rotary speed $\Omega a$ of the alternator. This speed is then recorded in the storage means 12, in time slices corresponding to the time elapsed since the beginning of the journey. It is possible, for example, to take the average of the rotary speed data thus acquired with those obtained during previous journeys for the same journey category in the same time slice. A probable time profile of the rotary speeds of the alternator $\Omega a(t)$ in this journey category is thus obtained. This profile will be used to determine the excitation current Ie for the alternator, as will be seen below.

According to a second procedure for carrying out the invention, use is advantageously made of the fact that the vehicle may be provided with an onboard navigation computer 7 in order to obtain the probable time profile of the rotary speeds of the alternator $\Omega a(t)$. This computer, in fact, computes a predicted itinerary for the journey and provides information relating to each segment of the itinerary, such as the length of the segment and the nature of the roads followed (motorway, fast lane, street, lane, etc.). Then, using a preestablished table of rotary speeds $\Omega a$ as a function of the nature of the road, the desired profile may be computed. In addition, when the navigation computer is combined with a traffic information receiver 7', each segment of the itinerary may be assigned information relating to the density of the traffic in this segment. It will then be possible to deduce therefrom the probable duration and driving speed over each segment and, using a simple ratio, the probable time profile of the rotary speeds of the alternator $\Omega a(t)$.

We now come to the determination of the control of the excitation current Ie for the alternator. At the start of the journey (time $t_0$), that is to say on switching on the computer 1, the latter determines an initial state of charge SOC0 of the battery 3 by measuring, for example, its open-circuit voltage at rest. This initial state and the measurement of the battery current Ib allow the variation in the state of charge of the battery 3 to be monitored throughout the journey by means of the equation:

$$SOC_{(t)} = SOC_0 + \int_{t0}^{t} \alpha \cdot I_b(\tau) \cdot d\tau \tag{1}$$

in which a is a charge rating such that $\alpha=1$ if $I_b$ is negative (the battery delivers current to the consumers 4) and $\alpha \leq 1$ if Ib is positive (the battery is being recharged by the alternator).

The computer 1 then computes the time profile of the rotary speeds $\Omega a(t)$ of the alternator 2 using either of the methods given above, or else by a combination of both of them.

Next, it measures the current Ic absorbed by the consumers 4 by means of the sensor 9 and of the measurement means 14. Assuming that the current Ic is constant throughout the duration of the journey, it then determines a time profile Ie(t) of the excitation current Ie using a predetermined optimization strategy. For example, Ie may be chosen such that Ie is zero if $\Omega a$ is less than a threshold $\Omega_{idle}$, and Ie provides the maximum efficiency for the alternator if $\Omega a$ is greater than this threshold. As may be seen in FIG. 3, which shows the efficiency curves of the alternator which are stored in the computer 1, for a rotary speed $\Omega_k$, following the arrow labeled (a), the current $Ia_k$ is determined such that this efficiency is a maximum (in this case, 60%) and the corresponding excitation current $Ie_k$ is drawn from it. Deduced from this is the battery current Ib=Ia−Ic at any instant, which is applied in Equation (1) to determine the final state of charge $SOC_f$ of the battery at the end of the journey. If the final state of charge thus obtained is below a predetermined minimum value, for example 70% of the rated charge of the battery, a time profile Ie(t) of the excitation current is recomputed such that the current Ia delivered by the alternator is greater than the current computed previously, while maximizing the efficiency (arrow (b) in the figure, 50% efficiency, $I'a_k$, $I'e_k$). The time profile Ie(t) thus computed is then stored in the memory 12 and applied to the alternator by the control means 15.

The profile Ie(t) is periodically updated, for example every 5 minutes, by remeasuring the current Ic absorbed by the consumers 4 and recomputing the final state of charge of the battery.

Of course, the invention is not limited to the implementation procedure described and illustrated, this having been given merely by way of example. By analogy with the first procedure for determining the time profile $\Omega a(t)$ of the speed of the alternator, it would be possible to determine a time profile Ic(t) of the current absorbed by the consumers from recordings made during the previous journeys and this profile could be used to determine an excitation current profile by means of an optimization method other than the "trial and error" method described above, while seeking, for example, to minimize an additional criterion such as the fuel consumption of the vehicle or the emission of pollutants.

What is claimed is:

1. A method for powering electrical consumers in a motor vehicle with an internal combustion engine and recharging a battery, which comprises:

providing an alternator having a rotary speed, the alternator producing an excitation current;

controlling an intensity of an excitation current for the alternator in dependence on an operating condition of the engine and of the vehicle during each trip, by a) determining an initial state of charge of the battery;

b) computing a probable time profile of the rotary speeds of the alternator for the respective trip;

c) measuring a current absorbed by the consumers;

d) determining an optimum time profile of the excitation current for the alternator such that a final state of charge of the battery at the end of the trip is at least equal to a predetermined threshold; and e) controlling the intensity of the excitation current in accordance with the optimum time profile.

2. The method according to claim 1, which comprises periodically repeating steps c) and d) throughout a duration of the trip.

3. The method according to claim 1, wherein the computing step comprises calculating the time profile of the rotary speeds of the alternator from recordings made during previous trips.

4. The method according to claim 1, which comprises computing the time profile of the rotary speeds of the alternator from information relating to the intended trip provided by a navigation device on board the vehicle.

5. The method according to claim 4, which comprises adjusting the time profile for a density of traffic over the respective trip.

6. The method according to claim 1, wherein step d) comprises computing the optimum time profile of the excitation current such that an efficiency of the alternator is at a maximum if the rotary speed is greater than a predetermined threshold speed, and the excitation current is zero if the rotary speed is not greater than the predetermined threshold speed.

7. A device for controlling an excitation current for an alternator in a motor vehicle with an internal combustion engine in dependence on operating conditions of the engine and of the vehicle during each trip, comprising:

a communication system connected to at least one of an engine management device and a navigation device of the motor vehicle;

a measurement system for determining a state of charge of a battery and an intensity of a current delivered to electrical consumers in the vehicle;

a computer device and a memory, said computer device being connected to said communication system and being programmed to:

compute, from information transmitted by the communication system, at a start of each trip, a probable time profile of rotary speeds of the alternator for the trip; and determine, in dependence on information provided by said measurement system, an optimum time profile of an excitation current for the alternator such that, at the end of the trip, a final state of charge of the battery is at least equal to a predetermined threshold; and a controller connected to the alternator for controlling the intensity of the excitation current delivered to the alternator.

* * * * *